United States Patent Office 3,023,463
Patented Mar. 6, 1962

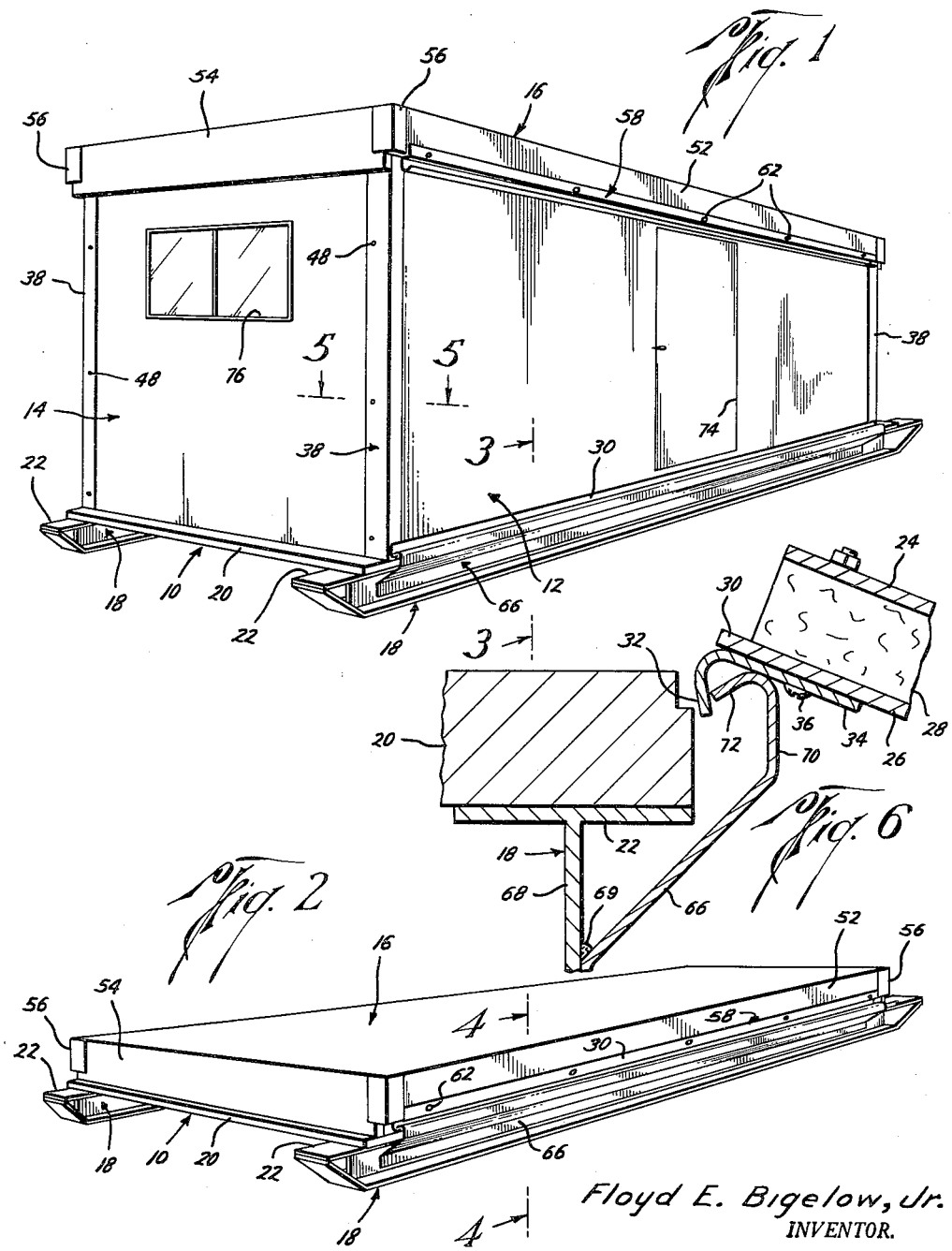

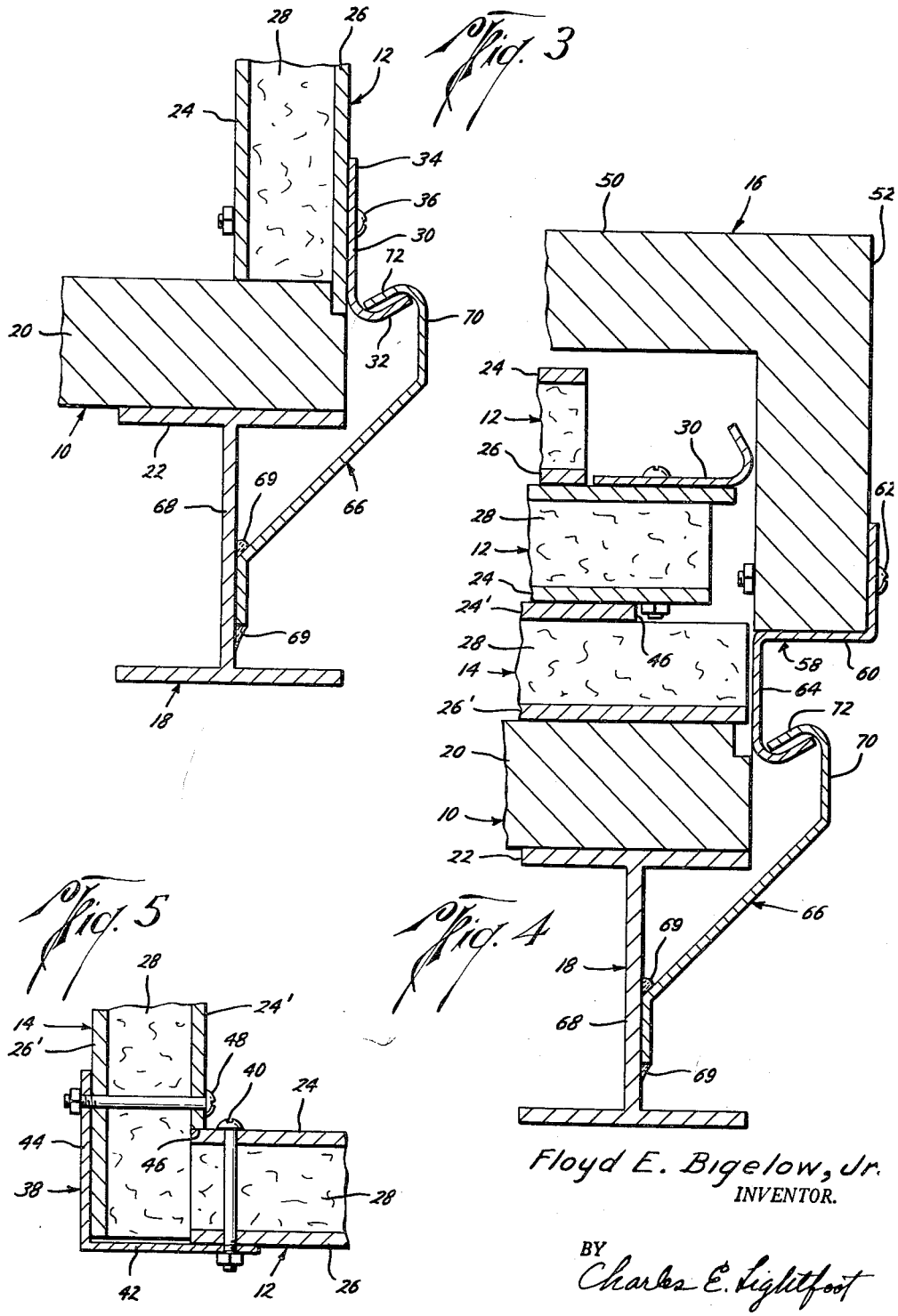

3,023,463
PORTABLE BUILDING
Floyd E. Bigelow, Jr., P.O. Box 7064, Houston, Tex.
Filed Aug. 21, 1959, Ser. No. 835,212
3 Claims. (Cl. 20—2)

This invention relates to a portable building, and more particularly to a building having detachable walls, floor and roof which may be formed into a compact assemblage for transportation, and to means for detachably securing the walls of such a building to the floor or base structure thereof.

The invention has for an important object the provision of a portable building having detachable walls, floor and roof and including means for releasably securing the walls to the floor to form a strong, weather excluding connection.

Another object of the invention is to provide a portable building having detachable walls, floor and roof and wherein the floor and roof are constructed to form a box for containing the walls when detached whereby the parts may be made into a compact assemblage for transportation.

A further object of the invention is the provision in a portable building of the kind referred to of means for detachably securing the walls to the floor to facilitate the erection and dismantling of the building and to form a weatherproof connection between the floor and walls.

Another object of the invention is to provide in a portable building of the type mentioned a joint structure for releasably connecting the walls to the floor which may also serve to releasably secured the floor and roof together with the walls enclosed between them to form a compact assemblage.

A further object of the invention is the provision of a portable building having detachable walls, floor and roof and embodying means for hingedly connecting the walls along their lower edges to the floor to permit the walls to be separately swung upwardly into vertical positions and means for detachably interconnecting the walls at their ends to form the corners of the building when the walls are erected.

The above and other important objects and advantages of the invention may best be understood from the following detailed description constituting a specification of the same when considered in conjunction with the annexed drawings, wherein:

FIGURE 1 is a perspective view illustrating a preferred embodiment of the invention and showing the building in its erected condition;

FIGURE 2 is a perspective view showing the building of the invention in a dismantled condition and formed into a compact assemblage for transportation;

FIGURE 3 is a fragmentary cross-sectional view, on an enlarged scale, taken along the line 3—3 of FIGURE 1, looking in the direction indicated by the arrows;

FIGURE 4 is a fragmentary cross-sectional view on an enlarged scale taken along the line 4—4 of FIGURE 2, looking in the direction indicated by the arrows;

FIGURE 5 is a fragmentary cross-sectional view on an enlarged scale, taken along the line 5—5 of FIGURE 1, looking in the direction indicated by the arrows; and FIGURE 6 is a fragmentary cross-sectional view similar to that of FIGURE 3, illustrating the manner in which the connecting elements of the side walls and the floor are connected and disconnected in erecting and disassembling the building, the connecting elements being shown in the positions which they occupy with the side wall in a lowered position preliminary to elevating the side wall in erecting the building or preliminary to the removal of the side wall in disassembling the building.

Referring now to the drawings in greater detail, the building of the invention embodies a floor or base 10, side and end walls 12 and 14, and a roof 16, which are adapted to be detachably assembled to permit the building to be erected as shown in FIGURE 1, and which may be detached and formed into a compact assemblage, as illustrated in FIGURE 2, for the purpose of transportation.

The floor or base structure 10 is preferably of rectangular shape supported on spaced apart parallel beams, such as the I-beams 18, which may form skids by which the building may be readily moved about. The floor of the building may be of any suitable construction, such as panels of heavy plywood, or the like, shown at 20, which extend between and are suitably affixed to the upper flanges 22 of the beams 18.

The side walls 12 are preferably of hollow construction formed of sheet metal, having inner and outer spaced apart panels 24 and 26, between which insulating material 28 of any convenient type may, if desired, be placed, and each of the side walls is provided exteriorly along its lower margin with an elongated connecting element 30, which is of J shape in cross-section, and which may be formed of any suitable material, such as sheet metal. The connecting element 30 preferably extends from end to end throughout the length of each side wall, the curved or hook portion 32 of the J opening upwardly and extending downwardly beyond the lower edge of the side wall and curving outwardly therefrom, and the element is attached to the side wall with the vertical arm 34 of the J in contact with the outer face of the side wall by any suitable means, such as the bolts 36.

An external corner post 38 of angular shape in cross-section is secured to each end of each of the side walls, as by means of bolts 40, or other suitable fastening means, with one flange 42 of the angle in contact with the outer face of the side wall and the other flange 44 positioned in longitudinally spaced relation to the end edge of the side wall and extending inwardly at right angles thereto.

The end walls 14 are of similar construction to that of the side walls 12, each end wall being formed of inner and outer spaced apart panels 24' and 26' between which insulating material 28 may be placed, and the end walls may be suitably detachably connected, at their lower edges, to the floor 20, as by means of inside hinges, not shown, to permit the end walls to be folded downwardly and inwardly into superposed relation to the floor 20, as best seen in FIGURE 4, or to be swung upwardly and outwardly to the erected positions as illustrated in FIGURE 1. The inner panels 24' of each end wall are preferably cut off, as indicated at 46 in FIGURES 4 and 5, for edgewise abutting engagement with the inner face of the inner panels 24 of the side walls, and to permit the side edge of the end walls to extend inside of the flanges 44 of the corner posts 38, as illustrated in FIGURE 5, when the building is erected. The flanges 44 of the corner posts and the end walls 14 are suitably perforated for the insertion therethrough of suitable fastenings such as bolts 48, which are removable to permit the walls to be detached.

The roof 16 is of generally inverted tray-like construction, having a top panel 50 and downwardly extending sides and ends 52 and 54, and at the corners of the roof, external, angle shaped corner caps 56 may be provided. The ends 54 of the roof extend downwardly somewhat beyond the sides 52 thereof, so that the lower edges of the ends 54 will rest upon the upper surface of the floor 20, with the lower edges of the sides 52 in upwardly spaced parallel relation to the floor, when the building has been assembled for transportation, as illustrated in FIGURE 2.

An elongated connecting element 58 having an angle shaped portion 60 is removably attached exteriorly to the lower marginal portion of each side 52 of the roof, as by means of bolts 62, which connecting element preferably extends from end to end substantially throughout the length of the side 52 and is formed with a downwardly extending portion 64 of J shape in cross-section similar to the connecting element 30. An elongated connector element 66 is attached to the web 68 of each of the beams 18, as by means of welding as indicated at 69, and extends outwardly and upwardly therefrom, and is formed with an inverted J shaped portion 70, whose curved or hook shaped portion 72 is directed inwardly and downwardly in outwardly spaced relation to the side edge of the floor 20, as best seen in FIGURES 3 and 4.

When the building is formed into the compact assemblage illustrated in FIGURE 2, for transportation, the end walls 14 will be folded down on the floor 20, and the side walls 12 will be detached and laid in superposed relation on top of the end walls in the arrangement illustrated in FIGURE 4 with the roof 16 positioned over the walls and secured to the base by means of the connector elements 66 and 58. In forming the building into the compact assemblage, the roof 16 is placed in position, and the connector element 58 is interconnected with the element 66 by inserting the hook shaped portion of the element 58 inside of the hook shaped portion 72 of the element 66 and placing the angle shaped portion 60 of the element 58 in contact with the lower edge portion of the side 52 and inserting the bolt 62 to secure the roof to the base.

With the parts thus formed into the compact assemblage illustrated in FIGURE 2, it will be apparent that the entire building may be readily lifted on to and off of a vehicle for transportation.

It will also be seen that the roof and floor form a box-like structure completely enclosing the walls and protecting the parts against weather.

To erect the building, the roof is detached from the floor by removing the bolts 62, so that the connector element 58 may be removed from the connector element 66 and the roof is lifted off. The side walls 12 may then be removed and placed in the position illustrated in FIGURE 6 with the hook portion 32 of the element 30 hooked over the hooked shape portion 72 of the element 66 and the side walls extending in lowered positions away from the floor.

The end walls 14 may then be swung upwardly to their upright positions and held therein while the side walls are swung upwardly to position them in the position of FIGURE 1. The connector elements 30 and 66 form hinges about which the side walls 12 swing upwardly and during such upward swinging movement of the hook shaped portions 32, the connector elements 30 will move into the hook shaped portions 72 of the connector elements 66, to securely connect the side walls to the base, and to form a weather excluding seal between the lower edges of the side walls and the floor. With the side and end walls thus erected, the side margins of the end walls will be in overlapping position with the end edges of the side walls and will be extending inside of the flanges 44 of the corner posts 38, so that the bolts 48 may then be inserted through the end walls and flanges 44 to securely connect the side and end walls together. When the walls are thus connected together, the corner posts 38 form a weather excluding seal between the walls at the corners.

When the side and end walls have been erected on the floor in the manner described above, the roof may then be placed over the upper edges of the walls to enclose the same, as seen in FIGURE 1.

It will, of course, be understood that the walls of the building may be of any convenient construction, and formed of any suitable material such as plywood, sheet metal, or the like, and that these walls may be of double or single thickness and may have suitable door and window openings, such as those shown at 74 and 76, at any desired locations therein.

It will thus be seen that the invention constructed as described above provides a collapsible building structure which is easily erected and disassembled, in which the parts may be formed into a compact assemblage for transportation and in which the parts are interfitted when the building is erected to effectively exclude the weather.

The invention is disclosed herein in connection with a specific embodiment of the same, but it will be understood that this is intended by way of example only, and that various changes can be made in the construction and arrangement of the parts within the spirit of the invention and the scope of the appended claims.

Having thus clearly shown and described the invention, what is claimed as new and desired to secure by Letters Patent is:

1. In a portable building, a rectangular floor, demountable walls erected on side marginal portions of the floor, a roof positioned over the upper edges of the walls and having downwardly extending sides positioned outwardly of the walls, two opposite ones of said sides extending downwardly beyond the other two of said sides, connector elements on two opposite ones of said walls extending along the lower edges thereof and having upwardly opening, hook-shaped marginal portions, connector elements connected to the floor extending along two opposite edges of the floor and each having an elongated, downwardly opening, hook-shaped marginal portion spaced outwardly from the adjacent edge of the floor, a connector element of Z-shape in cross-section positioned on and extending along the lower edge of each of said other two opposite ones of said sides with one flange thereof extending upwardly exteriorly of the lower edge thereof, the web of said Z-shaped element extending beneath the lower edge of the wall and the other flange thereof extending downwardly and having an upwardly opening, hook-shaped, marginal portion spaced downwardly from the lower edge of the wall in hooking engagement with the downwardly opening hook-shaped portion of one of the connector elements of the floor, said floor being of a size to permit the walls to be positioned in superposed stacked relation on the floor within the edges of the floor, and said roof being of a size to allow the roof to be positioned on the floor over the walls when stacked with the lower edges of said two opposite ones of said sides in contact with the floor outwardly of the walls to enclose the walls between the floor and roof with the connector elements of the roof in hooking engagement with the connector elements of the floor.

2. In a portable building, elongated, horizontally spaced, parallel supports, a rectangular floor on the supports, rectangular walls, a rectangular roof having downwardly extending sides, connector elements on and extending upwardly from the supports along opposite edges of the floor and each having a downwardly opening, hook-shaped portion positioned in outwardly spaced relation to the adjacent side edge of the floor, connector elements of Z-shape in cross-section extending along the lower edges of two opposite sides of the roof and each having a downwardly extending flange formed with an upwardly opening, hook-shaped marginal portion spaced below the adjacent lower edge of the side in hooking engagement with one of the connector elements of the supports, said floor being of a size to permit the walls to be positioned in superposed stacked relation thereon inwardly of the edges of the floor and said roof being of a size to enclose the walls between the floor and roof.

3. In a portable building elongated horizontally spaced, parallel supports, a rectangular floor on the supports, side and end walls erected on the floor, a rectangular roof having downwardly extending sides and ends extending downwardly beyond the lower edges of said sides, connector elements on the supports extending along the sides of the floor and formed with elongated, downwardly opening, hook-shaped marginal portions positioned in outwardly spaced, parallel relation to the side edges of the floor, connector elements on said side walls having elongated, upwardly opening, hook-shaped marginal portions positioned in outwardly extending parallel relation to the lower edges of the side walls and extending downwardly between the connector elements on the supports and the adjacent side edges of the floor in hooking engagement with said downwardly opening marginal portions, corner posts of angle shape in cross-section attached to the ends of each side wall with one flange extending exteriorly along and outwardly beyond one end edge of the side wall and the other flange extending across said end edge in outwardly spaced, parallel relation thereto in engagement with the external face of one of the end walls, and a connector element of Z-shape in cross-section positioned with one flange extending upwardly exteriorly of and attached to each side of the roof, the web of said Z-shaped element extending inwardly beneath the lower edge of the side of the roof and the other flange thereof extending downwardly and having an upwardly opening, hook-shaped marginal portion, said floor being of a size to permit the walls to be placed thereon in superposed stacked relation inwardly of the edges of the floor and said roof being of a size to allow the roof to be positioned on the floor over the walls when stacked with the ends of the roof resting on the floor and the sides and ends of the roof disposed about the walls with the upwardly opening marginal portions of the connector elements of the roof in hooking engagement with the downwardly opening marginal portions of the connector elements of the supports.

References Cited in the file of this patent

UNITED STATES PATENTS

| | | |
|---|---|---|
| 2,072,383 | Rottman | Mar. 2, 1937 |
| 2,828,842 | Plumley et al. | Apr. 1, 1958 |

FOREIGN PATENTS

| | | |
|---|---|---|
| 866,265 | France | Apr. 21, 1941 |
| 676,997 | Great Britain | Aug. 6, 1952 |